US008331399B2

(12) United States Patent
Meylan

(10) Patent No.: US 8,331,399 B2
(45) Date of Patent: Dec. 11, 2012

(54) RE-USING SEQUENCE NUMBER BY MULTIPLE PROTOCOLS FOR WIRELESS COMMUNICATION

(75) Inventor: Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 953 days.

(21) Appl. No.: 12/116,157

(22) Filed: May 6, 2008

(65) Prior Publication Data

US 2009/0003283 A1    Jan. 1, 2009

Related U.S. Application Data

(60) Provisional application No. 60/916,519, filed on May 7, 2007.

(51) Int. Cl.
*H04J 3/16* (2006.01)
(52) U.S. Cl. .................... 370/466; 370/474
(58) Field of Classification Search .......... 370/328–329, 370/331, 465–466, 469–472, 474, 476, 389, 370/392–394, 473
See application file for complete search history.

(56) References Cited

U.S. PATENT DOCUMENTS

| | | | |
|---|---|---|---|
| 6,687,248 B2 | 2/2004 | Jiang | |
| 6,904,016 B2 * | 6/2005 | Kuo et al. | 370/235 |
| 7,675,941 B2 * | 3/2010 | Kim et al. | 370/473 |
| 7,817,669 B2 * | 10/2010 | Pani et al. | 370/474 |
| 7,873,075 B2 * | 1/2011 | Rinne | 370/469 |
| 8,064,460 B2 * | 11/2011 | Tseng | 370/394 |
| 2002/0024972 A1 * | 2/2002 | Yi et al. | 370/470 |
| 2002/0048281 A1 * | 4/2002 | Yi et al. | 370/474 |
| 2002/0097723 A1 * | 7/2002 | Tourunen et al. | 370/392 |
| 2003/0091048 A1 * | 5/2003 | Jiang | 370/392 |
| 2004/0233878 A1 | 11/2004 | Liu et al. | |
| 2005/0008035 A1 * | 1/2005 | Eklund et al. | 370/473 |
| 2006/0007952 A1 * | 1/2006 | Oishi et al. | 370/465 |

(Continued)

FOREIGN PATENT DOCUMENTS

CN    1868157 A    7/2011

(Continued)

OTHER PUBLICATIONS

"Proposed WID for 64QAM for HSDPA", 3GPP TSG-RAN #34, RP-060846, Budapest, Hungary, Nov. 28-Dec. 1, 2006.

(Continued)

*Primary Examiner* — Chi H. Pham
*Assistant Examiner* — Kevin Mew
(74) *Attorney, Agent, or Firm* — Nerrie M. Zohn

(57) ABSTRACT

Techniques for re-using sequence number by multiple protocols in a protocol stack are described. In one design, at least one protocol data unit (PDU) from a first protocol may be received as at least one service data unit (SDU) at a second protocol, with each PDU being assigned a different sequence number by the first protocol. A sequence number for each SDU may be determined based on a sequence number for a corresponding PDU from the first protocol. A PDU may be formed by the second protocol based on the at least one SDU. A header may be generated for the PDU and may include (i) the sequence number and possibly a segment offset for the first SDU and (ii) a header block for each remaining SDU, which may include a segment length, a sequence number offset, and a segment offset for that SDU.

35 Claims, 11 Drawing Sheets

U.S. PATENT DOCUMENTS

| | | | |
|---|---|---|---|
| 2006/0062323 A1* | 3/2006 | Yi et al. ........................ | 375/295 |
| 2006/0221965 A1* | 10/2006 | Bosch et al. ................... | 370/392 |
| 2007/0047582 A1* | 3/2007 | Malkamaki ..................... | 370/470 |
| 2007/0291695 A1* | 12/2007 | Sammour et al. .............. | 370/331 |
| 2007/0291788 A1 | 12/2007 | Sammour et al. | |
| 2008/0089285 A1* | 4/2008 | Pirskanen et al. ............. | 370/329 |
| 2008/0226074 A1* | 9/2008 | Sammour et al. .............. | 380/270 |
| 2008/0273537 A1 | 11/2008 | Meylan et al. | |
| 2008/0273551 A1* | 11/2008 | Jiang ............................. | 370/466 |
| 2008/0279218 A1* | 11/2008 | Jiang ............................. | 370/470 |
| 2009/0010278 A1* | 1/2009 | Torsner et al. ................ | 370/466 |
| 2009/0036061 A1* | 2/2009 | Chun et al. .................... | 455/68 |
| 2009/0207802 A1* | 8/2009 | Lee et al. ....................... | 370/329 |
| 2010/0014446 A1* | 1/2010 | Chun et al. .................... | 370/310 |
| 2010/0091709 A1* | 4/2010 | Yi et al. ........................ | 370/328 |
| 2010/0111106 A1* | 5/2010 | Norris et al. .................. | 370/469 |
| 2010/0128742 A1* | 5/2010 | Chun et al. .................... | 370/474 |
| 2010/0178923 A1* | 7/2010 | Yi et al. ........................ | 455/436 |
| 2010/0208667 A1* | 8/2010 | Chun et al. .................... | 370/329 |

FOREIGN PATENT DOCUMENTS

| | | |
|---|---|---|
| EP | 1689134 | 8/2006 |
| JP | 2004521521 A | 7/2004 |
| JP | 2007503174 A | 2/2007 |
| WO | WO01024436 | 4/2001 |
| WO | 03043259 | 5/2003 |
| WO | 2005022812 | 3/2005 |
| WO | WO2006116620 A2 | 11/2006 |

OTHER PUBLICATIONS

International Search Report, PCT/US08/062963, International Search Authority, European Patent Office, Oct. 29, 2008.

Written Opinion, PCT/US08/062963, International Search Authority, European Patent Office, Oct. 29, 2008.

Alcatel-Lucent: "RLC PDU header structure in case of re-use of PDPC SN for RLC SN", 3GPP TSG RAN WG2 #58, R2-071660, <URL:http://www.3gpp.org/ftp/tsg_ran/WG2_RL2/TSGR2_58/Documents/R2-071660.zip>.

Nokia, "Ciphering for the User Plane", 3GPP TSG-RAN WG2 Meeting #57bis, St. Julian's, Malta, Mar. 26-30, 2007, R2-071241, 3 pgs.

Nokia, "Issues with RLC/MAC header structure", 3GPP TSG-RAN WG2 Meeting #55, Seoul, South Korea, Oct. 9-13, 2006, R2-062876, 3 pgs.

QUALCOMM Europe, "Ciphering sequence number in LTE", 3GPP TSG-RAN WG2 #58, R2-07xxxx, Kobe, Japan, pp. 1-4 (May 7-11, 2007).

* cited by examiner

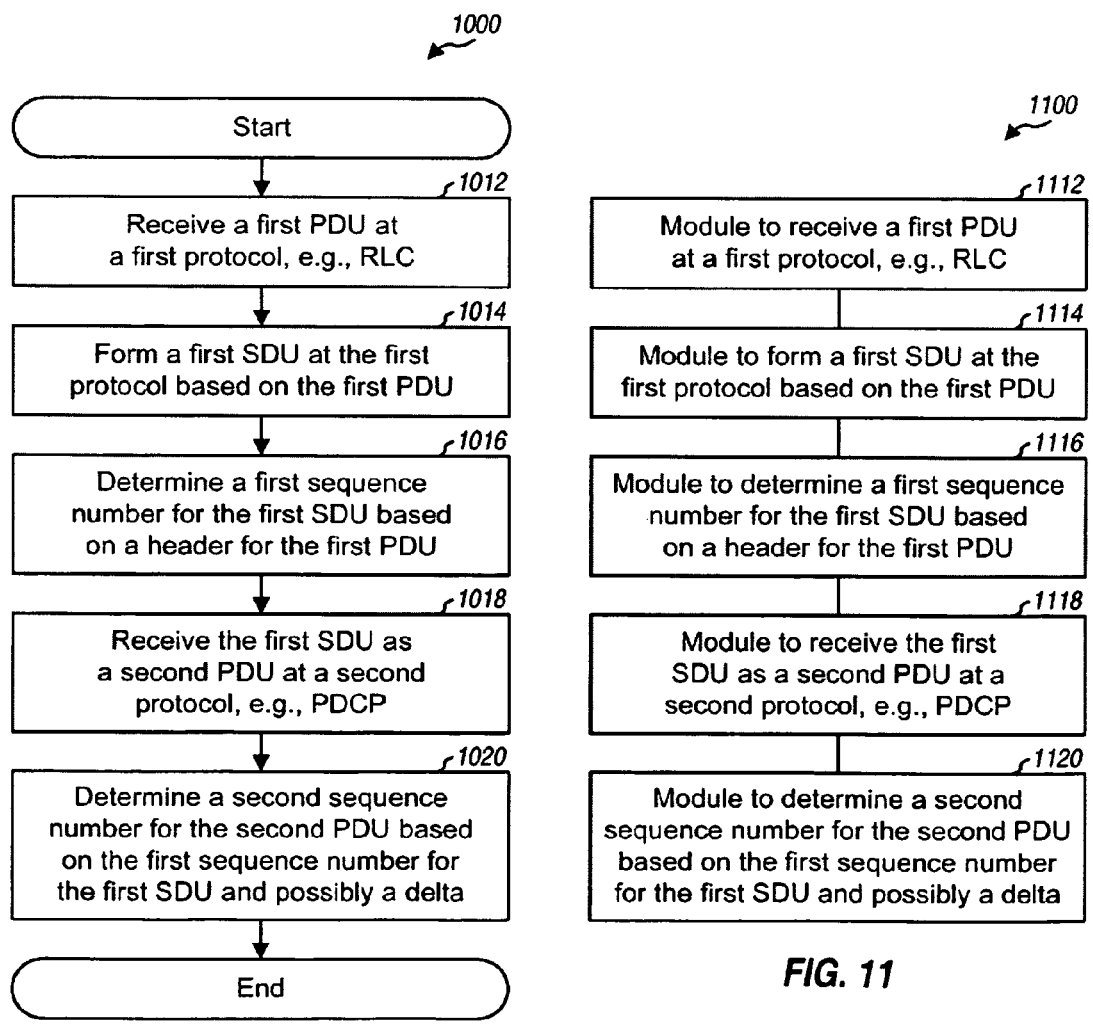

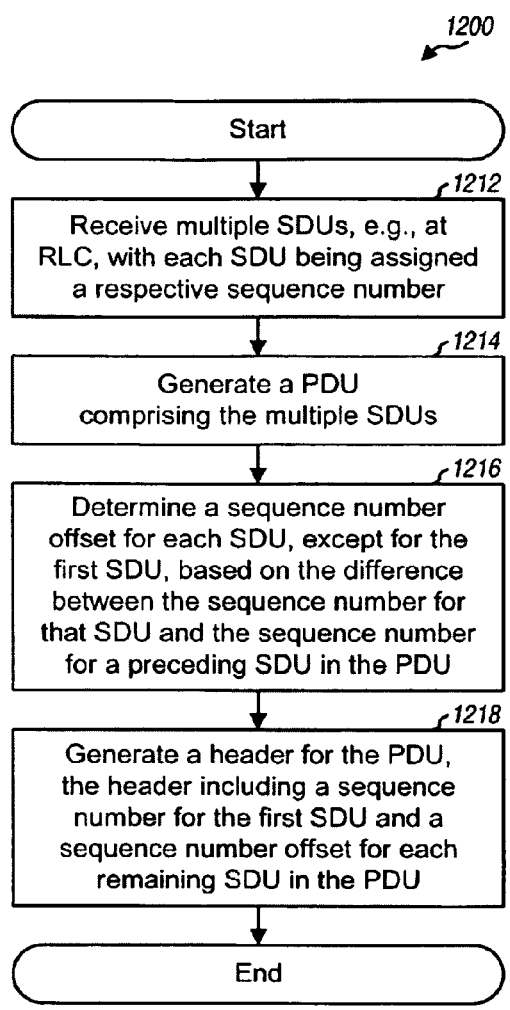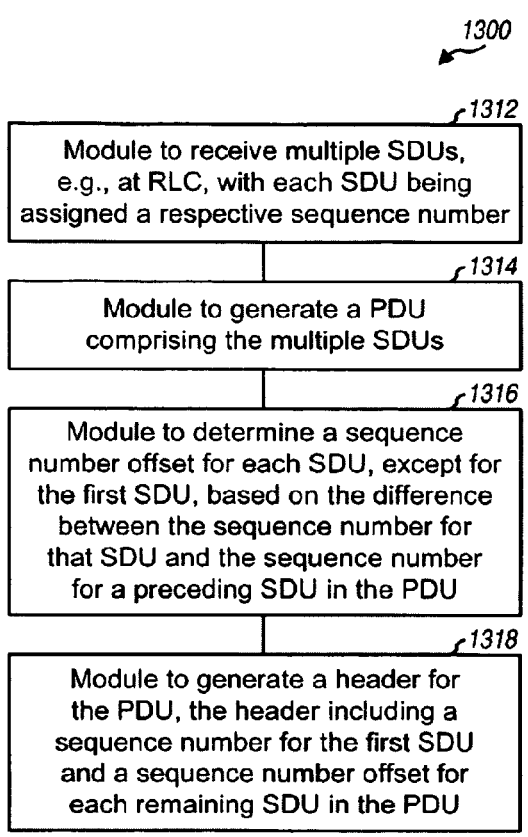
FIG. 12
FIG. 13

RE-USING SEQUENCE NUMBER BY MULTIPLE PROTOCOLS FOR WIRELESS COMMUNICATION

The present application claims priority to provisional U.S. Application Ser. No. 60/916,519, entitled "A METHOD AND APPARATUS FOR RLC HEADER FORMATS FOR RLC REUSING PDCP SEQUENCE NUMBERING," filed May 7, 2007, assigned to the assignee hereof and incorporated herein by reference.

BACKGROUND

I. Field

The present disclosure relates generally to communication, and more specifically to techniques for sending data in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a transmitter may process traffic data in accordance with a set of protocols in a protocol stack to generate output data for transmission to a receiver. Each protocol may receive service data units (SDUs) from a protocol in a higher layer or sublayer (if any) and may generate protocol data units (PDUs) for a protocol in a lower layer or sublayer (if any). Each PDU typically includes a header that contains pertinent information for that PDU. Since the header represents overhead, it is desirable to reduce header overhead to the extent possible in order to improve efficiency.

SUMMARY

Techniques for re-using sequence number by multiple protocols in a protocol stack in order to reduce header overhead are described herein. In one design, a sequence number assigned by a first protocol in the protocol stack may be re-used at a second protocol. In one design, the first protocol may be Packet Data Convergence Protocol (PDCP), and the second protocol may be Radio Link Control (RLC). The first and second protocols may also be other protocols.

In one design, a PDCP PDU may be received as an RLC SDU at RLC, with the PDCP PDU being assigned a PDCP sequence number (PDSN SN) by PDCP. An RLC sequence number (RLC SN) for the RLC SDU may be determined based on the PDCP SN. An RLC PDU may be formed based on the RLC SDU and may include all or a segment of the RLC SDU. A header may be generated for the RLC PDU and may include the RLC SN and possibly a segment offset indicating the starting byte in the RLC SDU corresponding to the first byte in the RLC PDU.

In another design, multiple PDCP PDUs may be received as multiple RLC SDUs at RLC, with each PDCP PDU being assigned a different PDCP SN by PDCP. An RLC SN for each RLC SDU may be determined based on the PDCP SN for the corresponding PDCP PDU. An RLC PDU may be formed based on the multiple RLC SDUs. A header may be generated for the RLC PDU and may include the RLC SN for the first RLC SDU and a header block for each remaining RLC SDU. The header block for each remaining RLC SDU may include (i) a segment length that conveys the amount of data from the RLC SDU being sent in the RLC PDU, (ii) an SN offset that indicates the difference between the RLC SN for the RLC SDU and the RLC SN for a preceding RLC SDU in the RLC PDU, (iii) a segment offset that indicates the starting byte in the RLC SDU being sent in the RLC PDU, (iv) an extension bit that indicates whether or not another header block will follow, and/or (v) some other information.

Various aspects and features of the disclosure are described in further detail below.

BRIEF DESCRIPTION OF THE DRAWINGS

FIG. 9 shows an apparatus for sending data with SN re-use.

FIG. 10 shows a process for receiving data with SN re-use.

FIG. 11 shows an apparatus for receiving data with SN re-use.

FIG. 12 shows a process for sending data with SN offsets.

FIG. 13 shows an apparatus for sending data with SN offsets.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
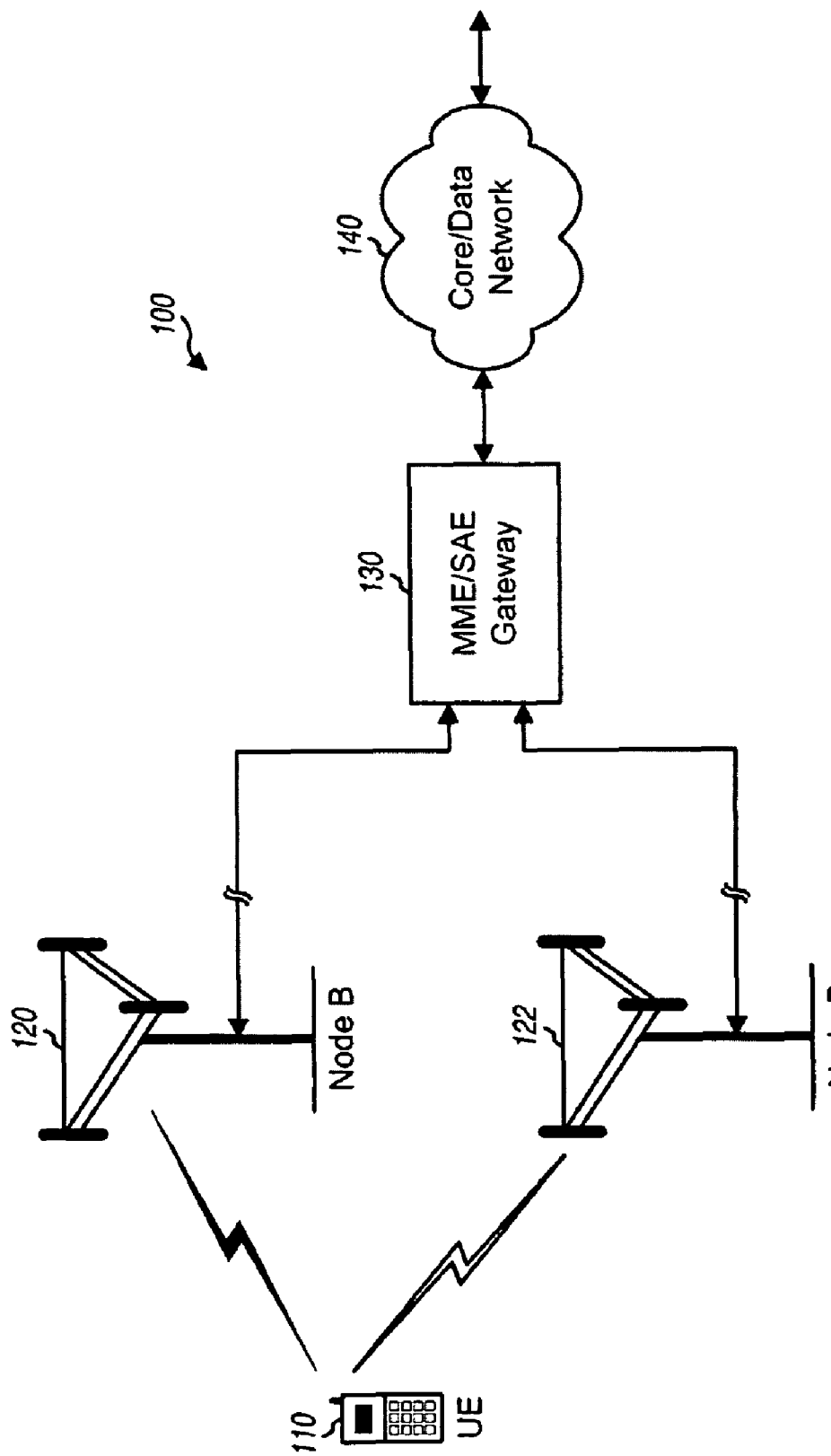
FIG. 1 shows a wireless communication system.

FIG. 1 shows a wireless communication system 100 with multiple Node Bs 120 and 122. A Node B may be a fixed station that communicates with the UEs and may also be referred to as an evolved Node B (eNB), a base station, an access point, etc. Node Bs 120 and 122 may communicate with a Mobility Management Entity/System Architecture Evolution (MME/SAE) gateway 130, which may support data services for the UEs. SAE gateway 130 may couple to a core and/or data network 140 (e.g., the Internet) and may communicate with other entities (e.g., remote servers and terminals) that couple to core/data network 140. The functions of Node Bs 120 and 122 and SAE gateway 130 are described in 3GPP TS 36.300, entitled "Evolved Universal Terrestrial Radio Access (E-UTRA) and Evolved Universal Terrestrial Radio Access Network (E-UTRAN); Overall description; Stage 2," which is publicly available.

A UE 110 may communicate with Node B 120 or 122 via the downlink and uplink. The downlink (or forward link) refers to the communication link from the Node B to the UE, and the uplink (or reverse link) refers to the communication link from the UE to the Node B. UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, etc.

Figure 2:
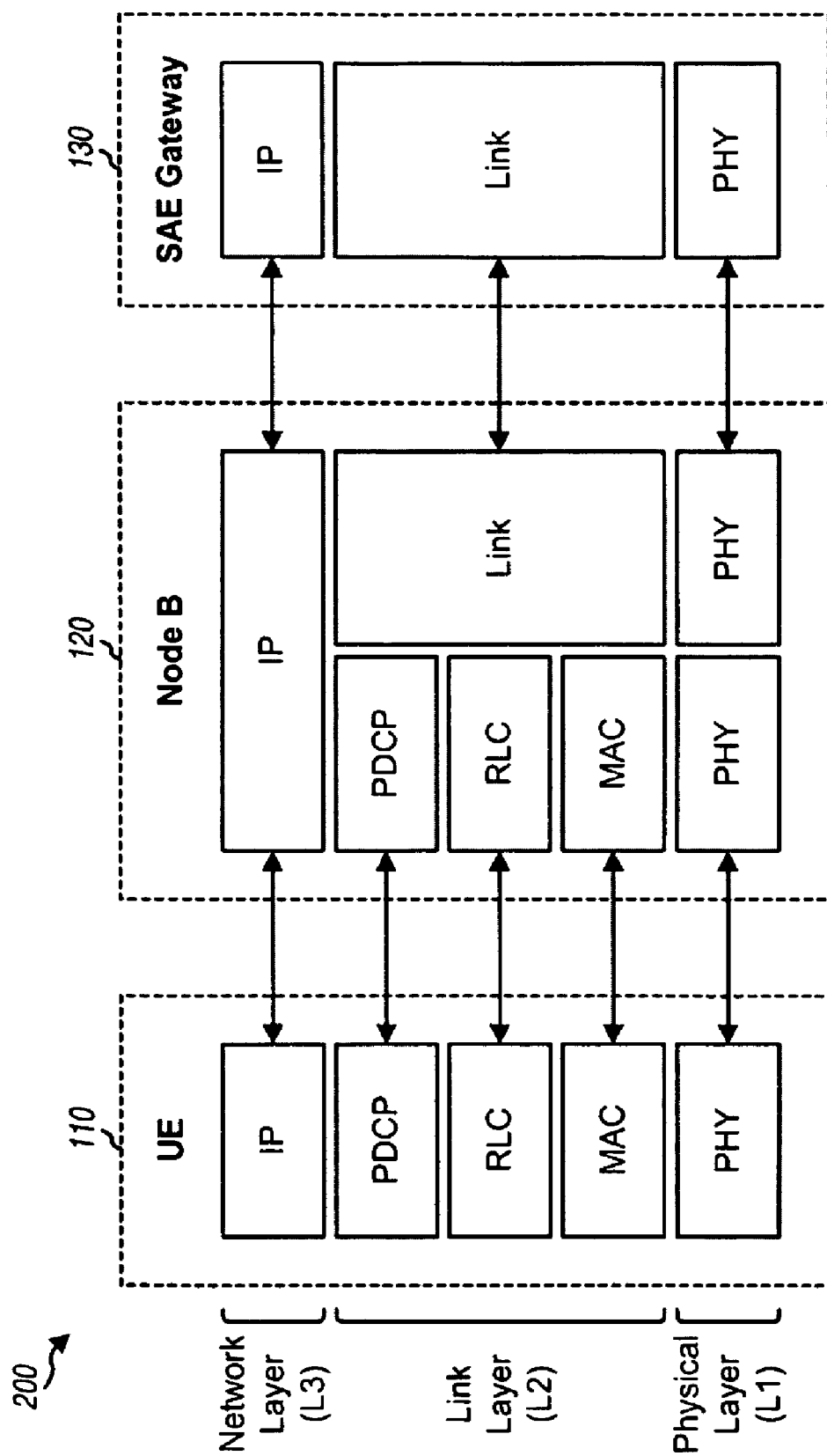
FIG. 2 shows example protocol stacks for various entities in the system.

FIG. 2 shows example protocol stacks 200 for a user plane in LTE. The user plane carries traffic data between UE 110 and SAE gateway 130 via. Node B 120, which is the serving Node B for the UE. Each entity maintains a protocol stack for communication with another entity. Each protocol stack typically includes a network layer (L3), a link layer (L2), and a physical layer (L1). UE 110 and SAE gateway 130 may exchange data using Internet Protocol (IP) at the network layer. Higher layer data may be encapsulated in IP packets, which may be exchanged between UE 110 and SAE gateway 130 via Node B 120.

The link layer is typically dependent on the radio technology. For LTE, the link layer for UE 110 is composed of three sublayers for PDCP, RLC, and Medium Access Control (MAC), which are terminated at Node B 120. UE 110 further communicates with Node B 120 via E-UTRA air-link interface at the physical layer (PHY). Node B 120 may communicate with SAE gateway 130 via IP and a technology-dependent interface for the link and physical layers.

PDCP may provide various services and functions such as:
Header compression and decompression of upper layer protocol headers, and
Ciphering (i.e., encryption) and integrity protection of data for security.
PDCP is described in 3GPP TS 36.323, entitled "Evolved Universal Terrestrial Radio Access (E-UTRA); Packet Data Convergence Protocol (PDCP) Specification," which is publicly available.

RLC may provide various services and functions such as:
Segmentation and concatenation of RLC SDUs at a transmitter,
Error correction through Automatic Repeat request (ARQ) by the transmitter,
Duplicate detection of lower layer SDUs at a receiver,
Re-ordering of RLC SDUs at the receiver, and
In-sequence delivery of upper layer PDUs at the receiver.
RLC is described in 3GPP TS 36.322, entitled "Evolved Universal Terrestrial Radio Access (E-UTRA); Radio Link Control (RLC) Protocol Specification," which is publicly available. RLC may be maintained for a radio link between UE 110 and Node B 120 and may be reset when the UE is handed over to another Node B 122. During the handover, RLC may be reset and the functions of duplicate detection, re-ordering of downlink RLC SDUs, and in-sequence delivery of upper layer PDUs on the uplink may be performed by PDCP.

The services and functions provided by PDCP and RLC in LTE may be provided by corresponding protocols in other radio technologies. For example, IP adaptation layer and Radio Link Protocol (RLP) in cdma2000 may provide services and functions similar to those provided by PDCP and RLC, respectively.

Figure 3:
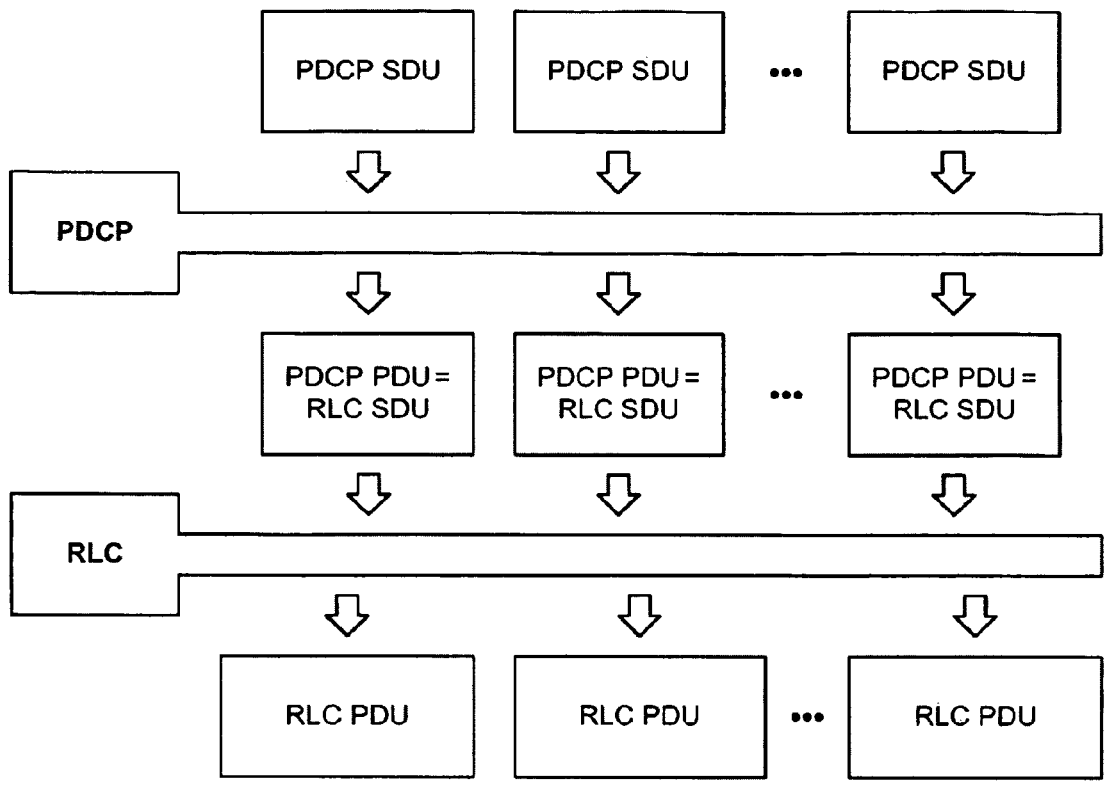
FIG. 3 shows processing by PDCP and RLC at a transmitter.

FIG. 3 shows exemplary processing by PDCP and RLC at a transmitter, which may be Node B 120 for data transmission on the downlink or UE 110 for data transmission on the uplink. PDCP receives PDCP SDUs from a higher layer protocol. For example, the higher layer protocol may be IP, and each PDCP SDU may include one or more IP packets. PDCP assigns a sequentially increasing PDCP SN to each PDCP SDU. In one design, PDCP performs header compression, ciphering and integrity protection for each PDCP SDU and provides a corresponding PDCP PDU. In another design, a PDCP PDU may include one or more PDCP SDU. In any case, for ciphering and integrity protection, PDCP uses a COUNT value for each block of data being ciphered. A block of data may be a PDCP SDU, a segment of a PDCP SDU, or a concatenation of multiple PDCP SDUs. PDCP uses the COUNT as a crypto sync for ciphering and integrity protection. The COUNT may be represented as (i) a hyperframe number (HFN) for the most significant bits (MSBs) of the COUNT and (ii) the PDCP SN for the least significant bits (LSBs) of the COUNT. The COUNT is often conveyed by signaling HFN once and then signaling only the PDCP SN along with each ciphered block. The COUNT may also be used for duplicate detection and in-sequence delivery at handover.

RLC receives the PDCP PDUs, which are referred to as RLC SDUs. In general, a PDU from a given layer/sublayer may be referred to as an SDU at the next lower layer/sublayer. RLC may perform segmentation and/or concatenation of the RLC SDUs and provide RLC PDUs of appropriate sizes to MAC. Segmentation refers to a process of partitioning an RLC SDU into smaller units, which are referred to as RLC segments. Re-segmentation refers to a process of partitioning an RLC segment or PDU into smaller units, which are also referred to as RLC segments. For simplicity, in the description herein, the term "segmentation" can refer to segmentation of an RLC SDU as well as re-segmentation of an RLC PDU. An RLC segment is a portion of an RLC SDU or PDU and may be obtained from segmentation or re-segmentation. RLC may also re-transmit RLC PDUs for all or portions of RLC SDUs received in error by a receiver. In general, each RLC PDU may include all or a portion of each of one or more RLC SDUs, as described below. MAC may process each RLC PDU and generate a corresponding MAC PDU.

In an aspect, PDCP SN may be re-used at RLC in order to reduce header overhead. RLC uses RLC SN for functions such as duplicate detection, re-ordering, and in-sequence delivery. Since PDCP already generates and uses PDCP SN for ciphering and other function, the PDCP SN may be re-used to address RLC data in order to reduce SN overhead across PDCP and RLC.

PDCP may assign a sequentially increasing PDCP SN to each PDCP PDU and may pass the PDCP PDU along with its PDCP SN to RLC. The PDCP SN however may not be included in a PDCP PDU header. In general, PDCP SN may have any suitable length, e.g., 5, 7, 12, 16, 32 or some other number of bits in length. Similarly, RLC SN may have any suitable length that may be equal to or shorter than the length of PDCP SN. For example, RLC SN may have length of 5, 7, 10, 12, 32 or some other number of bits. Furthermore, different RLC SN lengths may be used for different types of RLC SDUs. Furthermore, while the RLC SN may be limited in size, the underlying COUNT may be larger, such as 32 bits. The techniques described herein may be used for any PDCP SN length, any COUNT length, and any RLC SN length. For clarity, much of the description below assumes an RLC SN length of 12 bits. If the RLC SN length is shorter than the PDCP SN length, then the LSB portion of PDCP SN may be used for RLC SN, and the MSB portion of PDCP SN may be signaled once at connection setup. The full PDCP SN may be exchanged between UE 110 and Node B 120 at connection setup, e.g., using a mechanism similar to the one used to exchange START in WCDMA. A receiver may obtain HFN from the mechanism and may reconstruct the COUNT based on the HFN and the PDCP SN. In the description herein, addition for RLC SN is perform with modulo-T arithmetic, where T=$2^{12}$ for 12-bit RLC SN. Thus, RLC SN wraps around to zero after reaching T−1.

In one design, an RLC SN for an RLC PDU may be determined based on a PDCP SN for a PDCP PDU, as follows:

$$\text{RLC SN}=(\text{PDCP SN}+\Delta)\bmod T, \qquad \text{Eq (1)}$$

where $\Delta$ is an SN difference or delta between the PDCP SN and the RLC SN. PDCP SN may be incremented continuously even during handover whereas RLC SN may be reset at each handover to a new Node B. At each handover, the difference between the current PDCP SN and the reset RLC SN may be determined and used as the updated SN delta. The same SN delta may be used by the UE and the Node B for as long as the PDCP SN and RLC SN are incremented, which may be an entire communication session. RLC SN may also be derived from PDCP SN in other manners, e.g., with other offsets.

RLC may segment an RLC SDU into multiple RLC segments. RLC addressing within the RLC SDU may be achieved with either sub-sequence numbering or byte-based addressing. For sub-sequence numbering, the multiple RLC segments may be assigned different sub-sequence numbers. Each RLC segment may then be uniquely identified by the RLC SN for the RLC SDU as well as the sub-sequence number for that RLC segment. For byte-based addressing, the bytes in the RLC SDU may be assigned sequentially increasing byte addresses. Each RLC segment may then be uniquely identified by the RLC SN for the RLC SDU, the byte address of the first byte in the RLC segment, and the length of the RLC segment or the address of the last byte in the RLC segment. The terms "byte" and "octet" are synonymous and are used interchangeably. In general, RLC addressing within the RLC SDU may be achieved by partitioning the RLC SDU into data units of fixed or variable sizes and assigning different addresses to these data units. A data unit may be one byte, multiple bytes, etc. Byte-based addressing may be simpler to implement and may provide more flexibility for re-segmentation (e.g., for retransmissions) than sub-sequence numbering. The following description assumes the use of byte-based addressing for RLC segments.

For byte-based addressing, an RLC segment may be defined based on the following parameters:
  RLC SN—the sequence number for the RLC SDU containing the RLC segment,
  Segment offset (SO)—the byte address of the first byte in the RLC segment, and
  Segment Length (SL)—the length of the RLC segment given in units of bytes. The segment length may also be given by the byte address of the end of the RLC SDU within the RLC PDU. The segment length may be used to find RLC SDU boundaries when RLC concatenates.

The segment offset size and the segment length size may be dependent on the maximum RLC SDU size. In one design that is assumed in the following description, the maximum RLC SDU size is 4096 bytes, 12 bits may be used for the segment offset, and 12 bits may also be used for the segment length. Other segment offset and segment length sizes may also be used.

In one design, an RLC PDU includes an RLC header and a Data field. The Data field may carry data from one or more RLC SDUs. The length of the Data field or the entire RLC PDU may be conveyed in a MAC header. The RLC header may include various fields for pertinent parameters for the RLC PDU, e.g., parameters describing the one or more RLC SDUs carried in the RLC PDU. In the following description, a field in the RLC header may be either a fixed field or an extension field. A fixed field is always present in the RLC header and is denoted as "M". An extension field is present in the RLC header if it is needed and is denoted as "O". The fixed and extension fields may also be referred to as mandatory and optional fields, respectively. The length of the RLC PDU may be ascertained based on the length of a MAC PDU (if present) carrying the RLC PDU and may thus be omitted from the RLC header. Otherwise, the length of the RLC PDU may be included in the RLC header.

Various RLC header formats may be defined to support re-use of PDCP SN for RLC addressing. Some example RLC header formats are described below.

Table 1 shows a design of an RLC header that supports an RLC PDU carrying all or a segment of an RLC SDU. For this design, concatenation is not performed at RLC and may be performed at MAC if needed. The RLC header may include the fixed (M) and extension (O) fields given in Table 1.

TABLE 1

RLC Header without concatenation

| Field Name | Field Type | Size (bits) | Description |
|---|---|---|---|
| Data/Control | M | 1 | Indicate whether the RLC PDU contains traffic data or control data. |
| Sequence Number (SN) | M | 12 | Carry the RLC SN for the RLC SDU. |
| Poll | M | 1 | Indicate whether the transmitter is requesting a status report from the receiver. |
| Segment Extension (SE) | M | 1 | Set to '0' to indicate that the RLC PDU contains the entire RLC SDU or to '1' to indicate presence of the following extension fields. |
| Segment Offset (SO) | O | 12 | Indicate the starting byte in the RLC SDU being sent in the RLC PDU |
| Segment End | O | 1 | Set to '1' if the RLC PDU contains the end of the RLC SDU. |

The Segment Offset field indicates the start of the RLC segment within the RLC SDU and may be given by the byte address of the starting byte in the RLC SDU corresponding to the first byte in the RLC segment. A Segment Begin field is not needed since a Segment Offset of 0 means that the RLC PDU contains the beginning of the RLC SDU. In the design shown in Table 1, the RLC header has a size of two bytes without the segment parameters or a size of four bytes with the segment parameters. In general, an RLC header without concatenation may include fewer, more, or different fields than those shown in Table 1. Furthermore, the fields may have different sizes than those given in Table 1.

Figure 4:
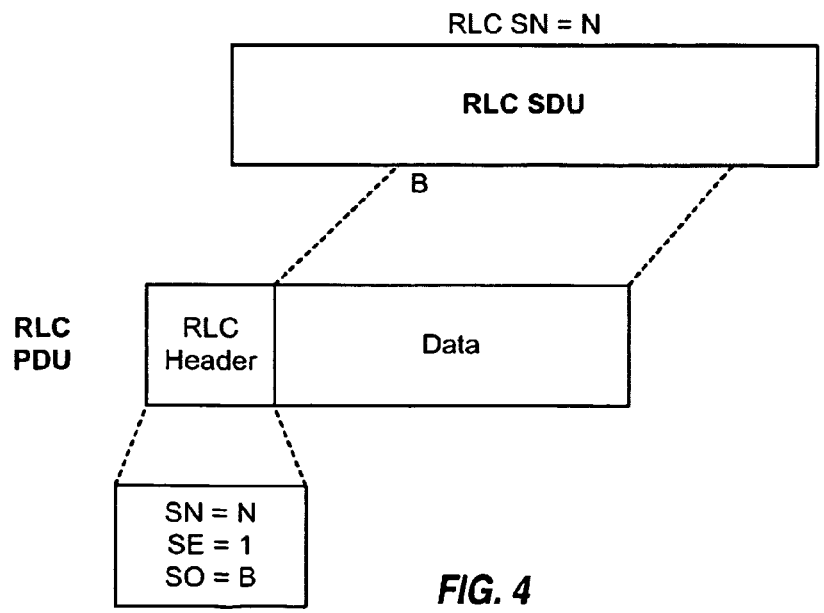
FIG. 4 shows one design of an RLC header with SN re-use.

FIG. 4 shows an RLC PDU with the RLC header shown in Table 1. In this example, an RLC SDU has an RLC SN of N. The RLC PDU carries a segment of the RLC SDU starting with the byte at address B. For the RLC header, the Sequence Number (SN) field is set to N, the Segment Extension (SE) field is set to '1', and the Segment Offset (SO) field is set to B. The size of the Data field can be ascertained based on MAC header information. The RLC segment size may be determined based on the segment offset of B and the Data field size.

Table 2 shows a design of an RLC header that supports an RLC PDU carrying up to two RLC segments. The first RLC SDU in the RLC PDU may be an entire RLC SDU or an RLC segment. Any number of whole RLC SDUs may follow the first RLC SDU. The last RLC SDU in the RLC PDU may be an entire RLC SDU or an RLC segment. The RLC header may include the fixed (M) and extension (O) fields given in Table 2.

An RLC PDU typically carries RLC SDUs with RLC SNs that are close to each other. To save header overhead, the RLC SN for each RLC SDU (except for the first RLC SDU) may be conveyed by an SN offset relative to the RLC SN for a preceding RLC SDU. In one design, the RLC SN for an RLC SDU may be defined as follows:

$$RLC\_SN(k) = RLC\_SN(k-1) + SN\_Offset(k), k=1, \ldots, K,\qquad \text{Eq (2)}$$

where SN_Offset(k) is the SN offset for the k-th RLC SDU in the RLC PDU, and
RLC_SN(k) is the RLC SN for the k-th RLC SDU in the RLC PDU.

The SN Offset field allows the RLC PDU to carry non-contiguous RLC SDUs, which may be useful for retransmissions. An SN offset of 0 may be used to send two non-contiguous segments of the same RLC SDU in the RLC PDU. In this case, the RLC SN for the (k−1)-th RLC SDU is the

TABLE 2

RLC Header with concatenation of up to two RLC segments

| Field Name | Field Type | Size (bits) | Description |
|---|---|---|---|
| Data/Control | M | 1 | Indicate whether the RLC PDU contains traffic data or control data. |
| Sequence Number (SN) | M | 12 | Carry the RLC SN for the first RLC SDU in the RLC PDU. |
| Poll | M | 1 | Indicate whether the transmitter is requesting a status report from the receiver. |
| Header Extension (HE) | M | 1 | Set to '1' to indicate that K Length Indicator Blocks are present (where K ≧ 1) or to '0' to indicate that no Length Indicator Blocks are present. |
| Segment Extension (SE) | M | 1 | Set to '1' to indicate that a Segment Offset is present or to '0' otherwise. |
| K Length Indicator Blocks (LIBs) | O | 0 or 16K | Contain K instances of the set of fields given in Table 3. |
| Segment Offset (SO) | O | 0 or 12 | Indicate the starting byte in the first RLC SDU being sent in the RLC PDU. |

In the design shown in Table 2, the Sequence Number field contains the RLC SN for the first RLC SDU in the RLC PDU. The RLC SN for each remaining RLC SDU is conveyed in the Length Indicator Block for that RLC SDU. If the RLC PDU contains a segment of the first RLC SDU, then the Segment Offset field is present and contains the address of the starting byte in the first RLC SDU corresponding to the first byte in the RLC PDU.

Table 3 shows a design of the Length Indicator Block for the RLC header shown in Table 2. K instances of the Length Indicator Block may be included in the RLC header when the Header Extension field is set to '1', where in general K≧1. Each instance of the Length Indicator Block provides parameters for an associated RLC SDU.

TABLE 3

Length Indicator Block

| Field Name | Size (bits) | Description |
|---|---|---|
| Segment Length (SL) | 12 | Indicate the length or the last byte of the associated RLC SDU sent in the RLC PDU. |
| Length Indicator Extension (LIE) | 1 | Set to '1' to indicate that another Length Indicator Block will follow or to '0' otherwise. |
| SN Offset (SNO) | 3 | Indicate the difference between the RLC SN for the associated RLC SDU and the RLC SN for the preceding RLC SDU in the RLC PDU. | same as the RLC SN for the k-th RLC SDU in the RLC PDU. With 3 bits for the SN Offset field, the maximum SN offset between two consecutive RLC SDUs is 7. An SN offset larger than 7 may be obtained by using one or more additional/dummy Length Indicator Blocks with the Segment Length field set to 0 and the SN Offset field set to appropriate value.

In another design, a Sequence Number field may be included in the Length Indicator Block and may carry the entire RLC SN. In yet another design, the SN Offset field or the Sequence Number field may be omitted from the Length Indicator Block. In this design, the RLC PDU may carry contiguous RLC SDUs with sequentially increasing RLC SNs.

The length of each RLC SDU (except for the first RLC SDU) may be determined based on the Segment Length field for that RLC SDU. The length of the entire RLC PDU may be determined based on MAC header information. The length of the first RLC SDU may then be determined by subtracting the length of each subsequent RLC SDU from the length of the RLC PDU.

In the design shown in Tables 2 and 3, the RLC header has a size of two bytes without the Length Indicator Block and Segment Offset fields. The RLC header includes two additional bytes for each Length Indicator Block and includes two additional bytes if the first RLC SDU is segmented. In general, an RLC header supporting concatenation of up to two RLC segments may include fewer, more, or different fields than those shown in Tables 2 and 3. For example, if concatenation is performed, then an End Bit field may be used for an RLC PDU to indicate whether or not it is the last RLC PDU for an RLC SDU. The fields in the RLC header may have different sizes than those given in Tables 2 and 3.

Figure 5:
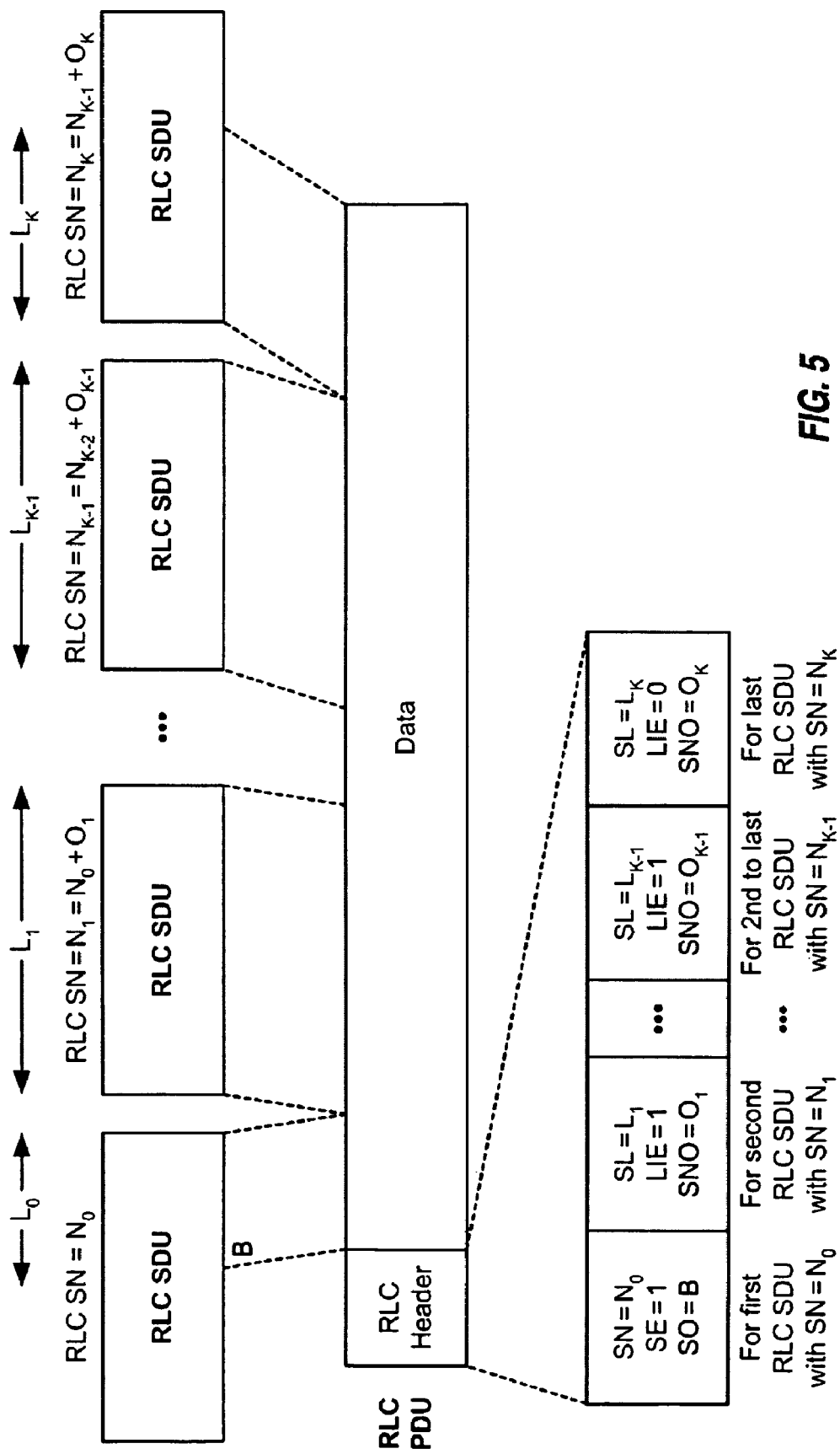
FIG. 5 shows another design of an RLC header with SN re-use.

FIG. 5 shows an RLC PDU with the RLC header shown in Tables 2 and 3. In this example, the RLC PDU carries a total of K+1 RLC SDUs, which includes a segment of the first RLC SDU starting with the byte at address B, followed by K−1 whole RLC SDUs, and concluding with a segment of the last RLC SDU. The first RLC SDU has an RLC SN of $N_0$. The second RLC SDU has a length of $L_1$ and an RLC SN of $N_1=N_0+O_1$, where $O_1$ is the SN offset for this RLC SDU relative to the first RLC SDU. The RLC SN for each subsequent RLC SDU may be computed in similar manner. The segment of the last RLC SDU has a length of $L_K$ and an RLC SN of $N_K=N_{K-1}+O_K$.

For the RLC header, the Sequence Number (SN) field is set to $N_0$, the Segment Extension (SE) field is set to '1', and the Segment Offset (SO) field is set to B for the first RLC SDU. The Header Extension field is set to '1' (not shown in FIG. 5), and the RLC header includes K Length Indicator Blocks for the K remaining RLC SDUs. The Length Indicator Block for the second RLC SDU has the Segment Length (SL) field set to $L_1$, the Length Indicator Extension (LIE) field set to '1', and the SN Offset (SNO) field set to $O_1$. The Length Indicator Block for each subsequent RLC SDU may be set in similar manner. The Length Indicator Block for the last RLC SDU has the Segment Length field set to $L_K$, the Length Indicator Extension field set to '0', and the SN Offset field set to $O_K$.

Table 4 shows a design of an RLC header that supports an RLC PDU carrying any number of RLC SDUs and any number of RLC segments. The RLC header may include the fixed (M) and extension (O) fields given in Table 4.

TABLE 4

RLC Header with concatenation of any number of RLC segments

| Field Name | Field Type | Size (bits) | Description |
| --- | --- | --- | --- |
| Data/Control | M | 1 | Indicate whether the RLC PDU contains traffic data or control data. |
| Sequence Number (SN) | M | 12 | Carry the RLC SN for the first RLC SDU in the RLC PDU. |
| Poll | M | 1 | Indicate whether the transmitter is requesting a status report from the receiver. |
| Header Extension (HE) | M | 1 | Set to '1' to indicate that K Length Indicator Blocks are present (where K ≧ 1) or to '0' to indicate that no Length Indicator Blocks are present. |
| K Length Indicator Blocks (LIBs) | O | 0 or 16K | Contain K instances of the set of fields given in Table 5. |

In the design shown in Table 4, the Sequence Number field contains the RLC SN for the first RLC SDU in the RLC PDU. The RLC SN for each remaining RLC SDU is conveyed in the Length Indicator Block for that RLC SDU.

Table 5 shows a design of the Length Indicator Block for the RLC header shown in Table 4. K instances of the Length Indicator Block may be included in the RLC header when the Header Extension field is set to '1', where in general K≧1. Each instance of the Length Indicator Block provides parameters for an associated RLC SDU.

TABLE 5

| Length Indicator Block | | |
| --- | --- | --- |
| Field Name | Size (bits) | Description |
| Segment Length (SL) | 12 | Indicate the length or the last byte of the associated RLC SDU sent in the RLC PDU. |

TABLE 5-continued

| Length Indicator Block | | |
| --- | --- | --- |
| Field Name | Size (bits) | Description |
| Segment Offset (SO) | 12 | Indicate the starting byte in the associated RLC SDU being sent in the RLC PDU. |
| Length Indicator Extension (LIE) | 1 | Set to '1' to indicate that another Length Indicator Block will follow or to '0' otherwise. |
| SN Offset (SNO) | 3 | Indicate the difference between the RLC SN for the associated RLC SDU and the RLC SN for the preceding RLC SDU in the RLC PDU. |

The length of each RLC SDU (except for the first RLC SDU) may be determined based on the Segment Length field for that RLC SDU. The length of the first RLC SDU may be determined based on the length of the RLC PDU and the length of each remaining RLC SDU.

In the design shown in Tables 4 and 5, the RLC header has a size of two bytes without any Length Indicator Block. The RLC header includes four additional bytes for each Length Indicator Block. In general, an RLC header supporting concatenation of any number of RLC segments may include fewer, more, or different fields than those shown in Tables 4 and 5. Furthermore, the fields may have different sizes than those given in Tables 4 and 5.

Figure 6:
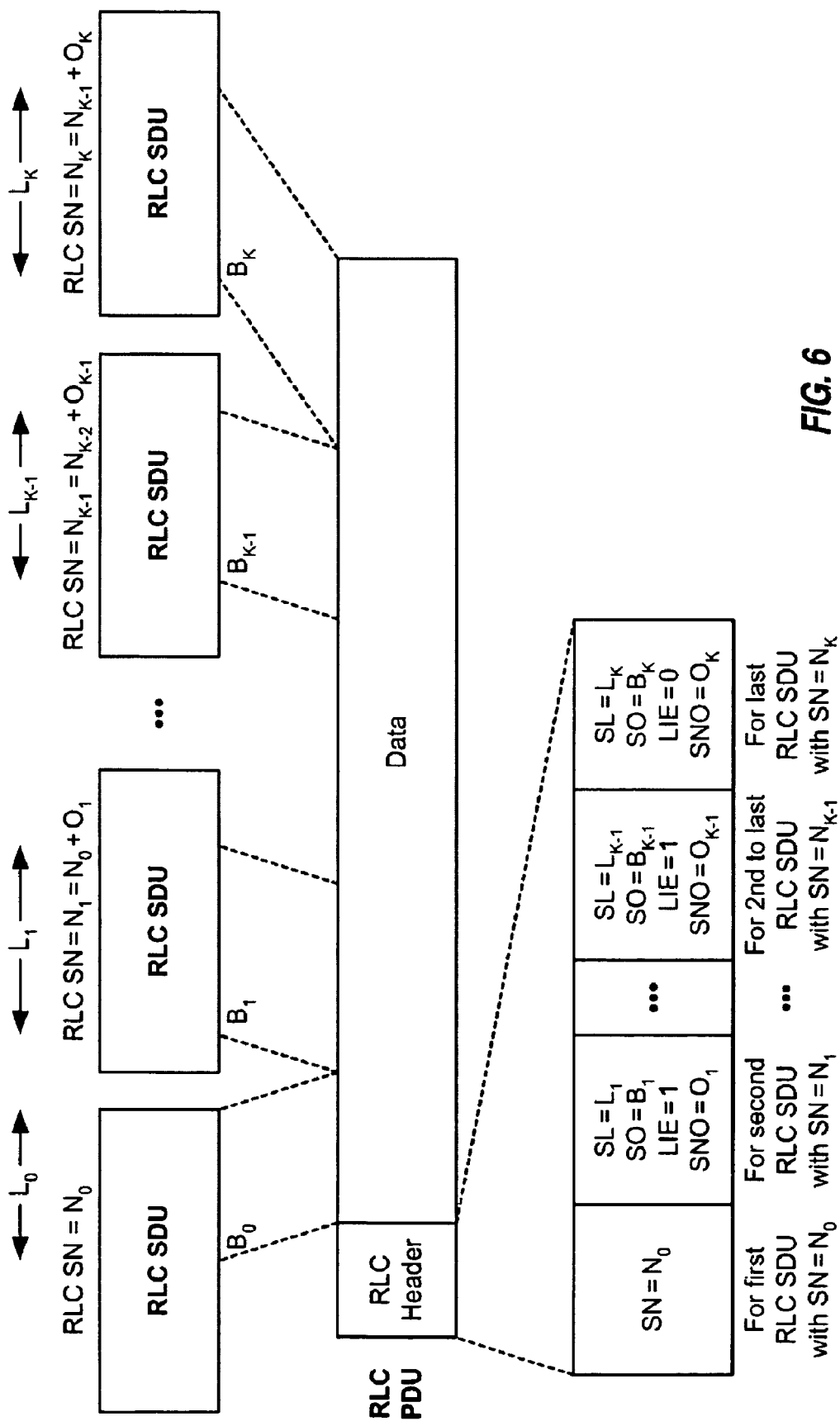
FIG. 6 shows yet another design of an RLC header with SN re-use.

FIG. 6 shows an RLC PDU with the RLC header shown in Tables 4 and 5. In this example, the RLC PDU carries a total of K+1 RLC SDUs, where each RLC SDU may be whole or segmented. The RLC SDUs have RLC SNs that may be determined as described above for FIG. 5. In the example shown in FIG. 6, the RLC PDU carries a segment of the first RLC SDU starting with the byte at $B_0$ and having a length of $L_0$, followed by a segment of the second RLC SDU starting with the byte at $B_1$ and having a length of $L_1$, and so on, and concluding with a segment of the last RLC SDU starting with the byte at $B_K$ and having a length of $L_K$.

For the RLC header, the Sequence Number (SN) field is set to $N_0$ for the first RLC SDU. The Header Extension field is set to '1' (not shown in FIG. 6), and the RLC header includes K Length Indicator Blocks for the K remaining RLC SDUs. The Length Indicator Block for the second RLC SDU has the Segment Length (SL) field set to $L_1$, the Segment Offset (SO) field set to $B_1$, the Length Indicator Extension (LIE) field set to '1', and the SN Offset (SNO) field set to $O_1$. The Length Indicator Block for each subsequent RLC SDU may be set in similar manner. The Length Indicator Block for the last RLC SDU has the Segment Length field set to $L_K$, the Segment Offset field set to $B_K$, the Length Indicator Extension field set to '0', and the SN Offset field set to $O_K$.

Three specific RLC header formats have been described above. Other RLC header formats may also be defined and used for RLC PDUs. An RLC header format may or may not support concatenation. If concatenation is supported, then the RLC header may include appropriate fields to describe each RLC SDU or segment carried in an RLC PDU. The RLC header may also include other fields to support other functions.

In another aspect, RLC SN may be re-used at PDCP in order to reduce header overhead. In one design, RLC may have the following characteristics:

Segmentation is not supported in RLC and may be performed in MAC, and

Concatenation is not supported in RLC and a different RLC SN is used for each RLC PDU.

RLC may handle RLC SDUs of variable sizes and may be able to support high throughput radio technologies such as LTE.

Figure 7:
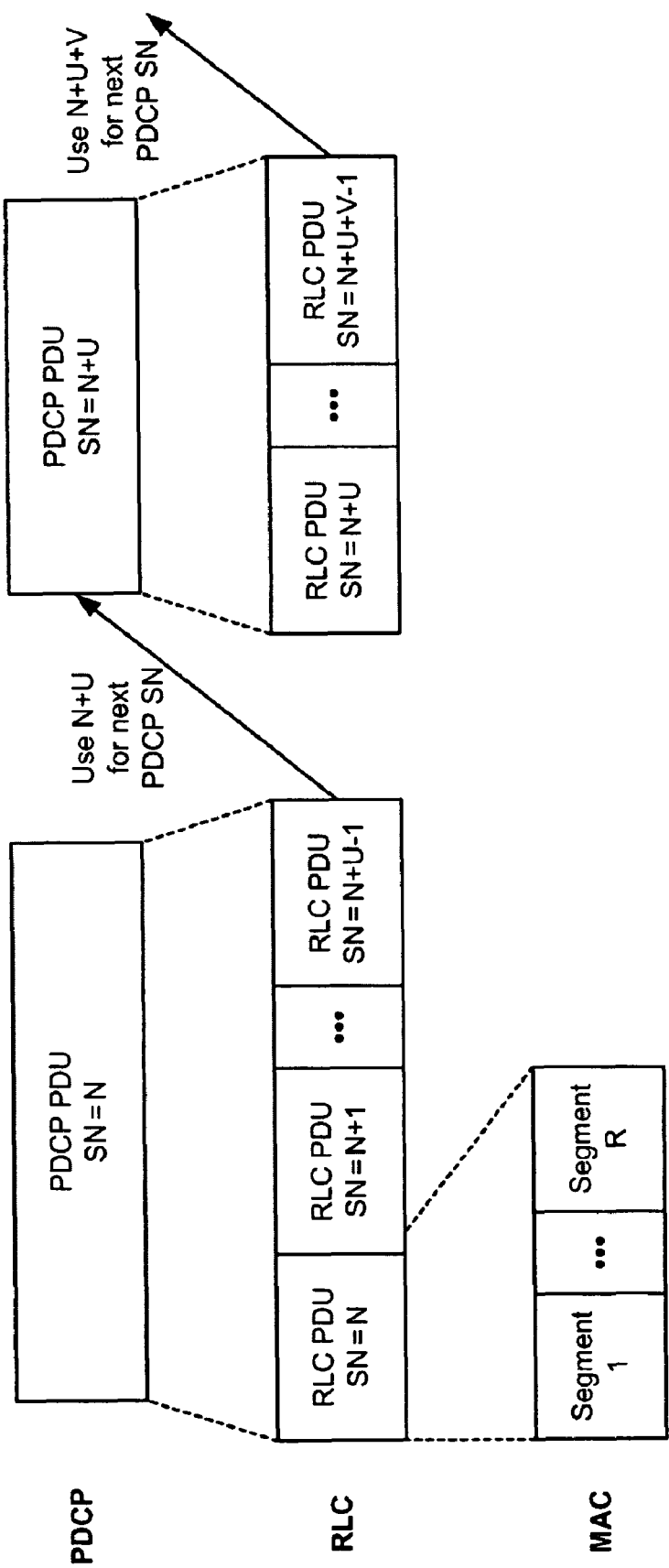
FIG. 7 shows a design of re-using RLC SN for PDCP at the transmitter.

FIG. 7 shows a design of re-using RLC SN for PDCP at a transmitter. A full PDCP SN may be exchanged between UE 110 and Node B 120 at connection setup with a suitable mechanism. PDCP may generate and pass a PDCP PDU with a PDCP SN of N to RLC. RLC may generate one or more (U) RLC PDUs of fixed or variable sizes for the PDCP PDU and may assign an RLC SN to each RLC PDU. The RLC SN for the first RLC PDU may be derived from the PDCP SN, e.g., as shown in equation (1) with the SN delta being zero or non-zero. For simplicity, FIG. 7 shows the SN delta being equal to zero. RLC may assign the first RLC PDU with an RLC SN of N, the next RLC PDU with an RLC SN of N+1, and so on, and the last RLC PDU with an RLC SN of N+U−1. The last RLC PDU may have an End Bit (EB) field set to '1' to indicate that it is the last RLC PDU for the PDCP PDU. RLC may pass the U RLC PDUs with RLC SNs of N to N+U−1 to MAC to transmit the PDCP PDU.

As soon as RLC determines that U RLC PDUs will be generated for the PDCP PDU, RLC may communicate U to PDCP. PDCP may then assign the next PDCP PDU with PDCP SN of N+U and may process and send this PDCP PDU to RLC. RLC may generate one or more (V) RLC PDUs for the PDCP PDU and may assign an RLC SN to each RLC PDU starting with N+U. Since PDCP uses the next available RLC SN of N+U for the PDCP PDU, the RLC PDUs have sequentially increasing RLC SNs, and there are no holes or overlap in the RLC sequence numbering.

A receiver may obtain the full PDCP SN at connection setup. RLC at the receiver may obtain RLC PDUs from MAC and may assemble these RLC PDUs into complete PDCP PDUs, as indicated by the Segment Length and End Bit fields for each RLC PDU. PDCP may determine the PDCP SN for each PDCP PDU based on the RLC SN for the first RLC PDU in the PDCP PDU. This RLC SN may be passed along with the PDCP PDU to PDCP. The receiver can thus determine the PDCP SN for each successfully received PDCP PDU based on the RLC SN for the first RLC PDU in the PDCP PDU.

Figure 8:
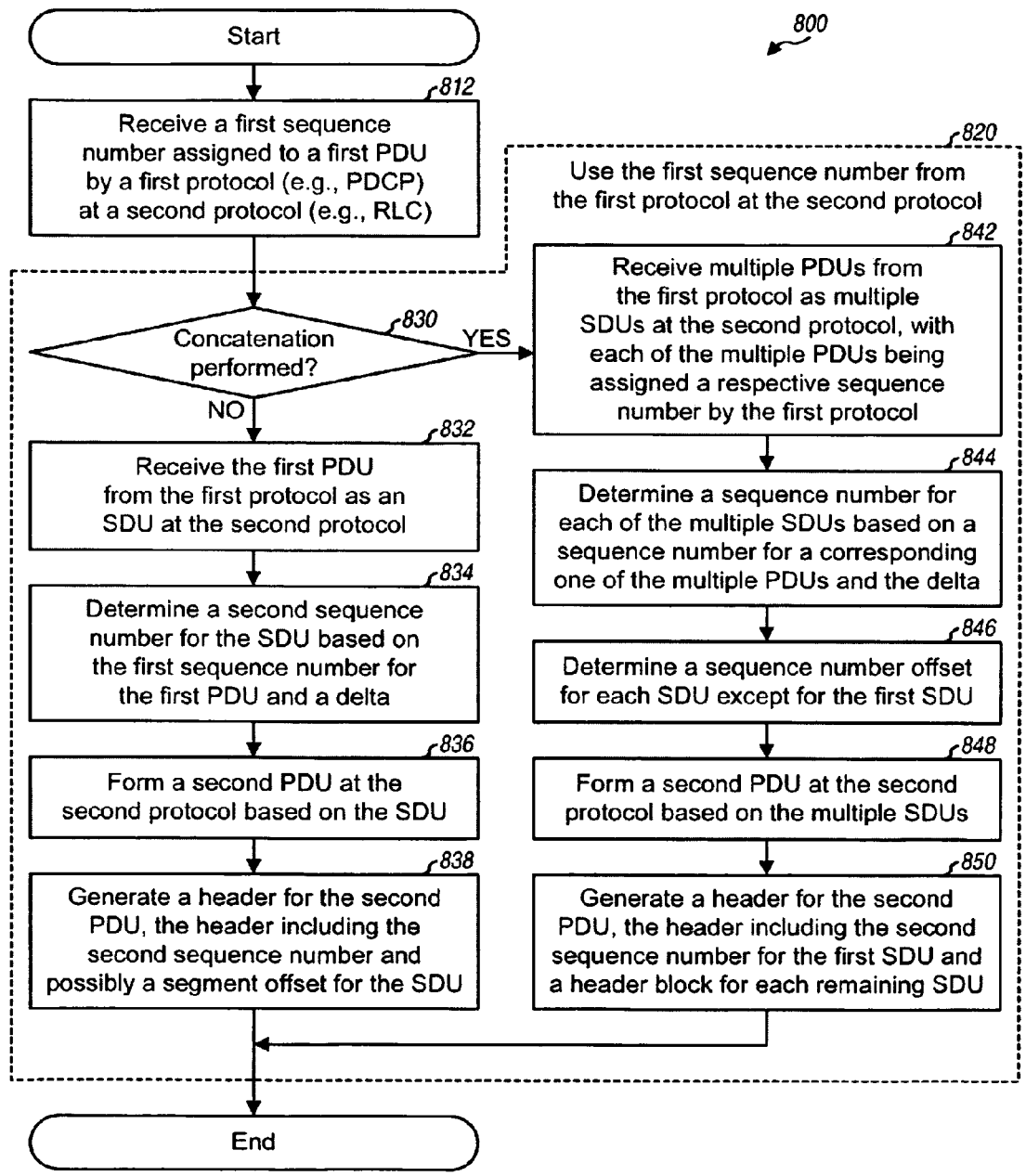
FIG. 8 shows a process for sending data with SN re-use.

FIG. 8 shows a design of a process 800 for sending data with sequence number re-use. Process 800 may be performed by a transmitter, which may be a Node B for data transmission on the downlink or a UE for data transmission on the uplink. A first sequence number assigned to a first PDU by a first protocol may be received at a second protocol (block 810). The first sequence number from the first protocol may be used at the second protocol (block 820).

In one design, the first protocol may be above the second protocol in a protocol stack, and the sequence number may be passed down the protocol stack, e.g., outside of the first protocol's PDU. For example, the first protocol may be PDCP, and the second protocol may be RLC.

In one design of block 820, if concatenation is not performed, as determined in block 830, then the first PDU may be received from the first protocol as an SDU at the second protocol (block 832). A second sequence number for the SDU may be determined based on the first sequence number for the first PDU and a delta, e.g., as shown in equation (1) (block 834). The sequence numbering of the second protocol may be reset at handover or connection setup or at other instants. The delta may be determined based on the difference between sequence number for the first protocol and sequence number for the second protocol after resetting the sequence numbering. Data within the SDU may be addressed based on the second sequence number and an segment offset from the start of the SDU. A second PDU may be formed at the second protocol based on the SDU and may include all or a segment of the SDU (block 836). A header may be generated for the second PDU and may include the second sequence number for the SDU (block 838). If the second PDU includes a segment of the SDU, then the header may include a segment offset indicating the start of the segment within the SDU, e.g., the starting byte in the SDU corresponding to the first byte in the second PDU.

If concatenation is performed as determined in block 830, then multiple PDUs from the first protocol may be received as multiple SDUs at the second protocol, with each of the multiple PDUs being assigned a different sequence number by the first protocol (block 842). The multiple PDUs may include the first PDU, and the multiple SDUs may include a first SDU corresponding to the first PDU. A sequence number for each of the multiple SDUs may be determined based on a sequence number for a corresponding one of the multiple PDUs and the delta (block 844). A sequence number offset for each SDU, except for the first SDU, may be determined based on the difference between the sequence number for that SDU and the sequence number for a preceding SDU (block 846).

A second PDU may be formed at the second protocol based on the multiple SDUs and may include the first SDU followed by remaining ones of the multiple SDUs (block 848). In one design, the second PDU may include all or a portion of the first SDU, all or a portion of the last SDU, and all of each SDU between the first and last SDUs, as shown in FIG. 5. In another design, the second PDU may include all or a portion of each of the multiple SDUs, as shown in FIG. 6. A header may be generated for the second PDU and may include the second sequence number for the first SDU and a header block (e.g., a Length Indicator Block) for each remaining SDU (block 850). For the design shown in Table 2, the header may further include a segment offset indicating the starting byte in the first SDU corresponding to the first byte in the second PDU. The header block for each remaining SDU may include (i) a segment length that conveys the amount of data from the SDU being sent in the second PDU, (ii) the sequence number offset for the SDU, (iii) an extension bit that indicates whether or not another header block for another SDU will follow in the header, (iv) a segment offset that indicates the starting byte in the SDU being sent in the second PDU, and/or (v) some other information.

In another design, the first protocol may be below the second protocol in the protocol stack, and the first sequence number may be passed from the first protocol up to the second protocol. For example, the first protocol may be RLC, and the second protocol may be PDCP. In one design, a sequentially increasing sequence number may be assigned to each PDU generated at the first protocol (e.g., RLC). A sequence number from the first protocol may be passed up to the second protocol (e.g., PDCP) for each PDU generated at the second protocol. Each PDU generated at the second protocol may be assigned a sequence number determined based on the sequence number passed up by the first protocol for that PDU.

FIG. 9 shows a design of an apparatus 900 for sending data with sequence number re-use. Apparatus 900 includes a module 910 to receive a first sequence number assigned to a first PDU by a first protocol, and a module 920 to use the first sequence number from the first protocol at the second protocol.

FIG. 10 shows a design of a process 1000 for receiving data with sequence number re-use. Process 1000 may be performed by a receiver, which may be a UE for data transmission on the downlink or a Node B for data transmission on the uplink. A first PDU may be received at a first protocol, e.g., RLC (block 1012). A first SDU may be formed at the first protocol based on the first PDU (block 1014). A first sequence number for the first SDU may be determined based on (e.g., obtained from) a header for the first PDU (block 1016). The first SDU may be received as a second PDU at a second protocol, e.g., PDCP (block 1018). A second sequence number for the second PDU may be determined based on the first sequence number for the first SDU and possibly a delta (block 1020).

In one design, concatenation is not performed. For block 1014, the first PDU may be mapped to the first SDU starting either at the beginning of the first SDU or at a location determined by a segment offset obtained from the header. In another design, concatenation is performed. For block 1014, multiple SDUs may be formed at the first protocol based on the first PDU, with the multiple SDUs including the first SDU followed by remaining SDUs. The sequence number for each SDU, except for the first SDU, may be determined based on a sequence number offset for that SDU (which may be obtained from the header) and a sequence number for a preceding SDU. A segment length and possibly a segment offset for each SDU may also be obtained from the header. Data from the first PDU may then be mapped to the multiple SDUs as indicated by the segment length and the segment offset for each SDU.

FIG. 11 shows a design of an apparatus 100 for receiving data with sequence number re-use. Apparatus 1100 includes a module 1112 to receive a first PDU at a first protocol, a module 1114 to form a first SDU at the first protocol based on the first PDU, a module 116 to determine a first sequence number for the first SDU based on a header for the first PDU, a module 1118 to receive the first SDU as a second PDU at a second protocol, and a module 1120 to determine a second sequence number for the second PDU based on the first sequence number for the first SDU and possibly a delta.

FIG. 12 shows a design of a process 1200 for sending data with sequence number offsets. Process 1200 may be performed by a transmitter. Multiple SDUs may be received (e.g., at RLC), with each SDU being assigned a respective sequence number (block 1212). A PDU comprising the multiple SDUs may be generated (block 1214). The multiple SDUs may have consecutive or non-consecutive sequence numbers. A sequence number offset may be determined for each SDU, except for the first SDU, based on the difference between the sequence number for that SDU and the sequence number for a preceding SDU in the PDU (block 1216). A header may be generated, for the PDU and may include the sequence number for the first SDU and the sequence number offset for each remaining SDU in the PDU (block 1218).

FIG. 13 shows a design of an apparatus 1300 for sending data with sequence number offsets. Apparatus 1300 includes a module 1312 to receive multiple SDUs, with each SDU being assigned a respective sequence number, a module 1314 to generate a PDU comprising the multiple SDUs, a module 1316 to determine a sequence number offset for each SDU based on the difference between the sequence number for that SDU and the sequence number for a preceding SDU in the PDU, and a module 1318 to generate a header for the PDU, which may include the sequence number for the first SDU and the sequence number offset for each remaining SDU in the PDU.

Figure 14:
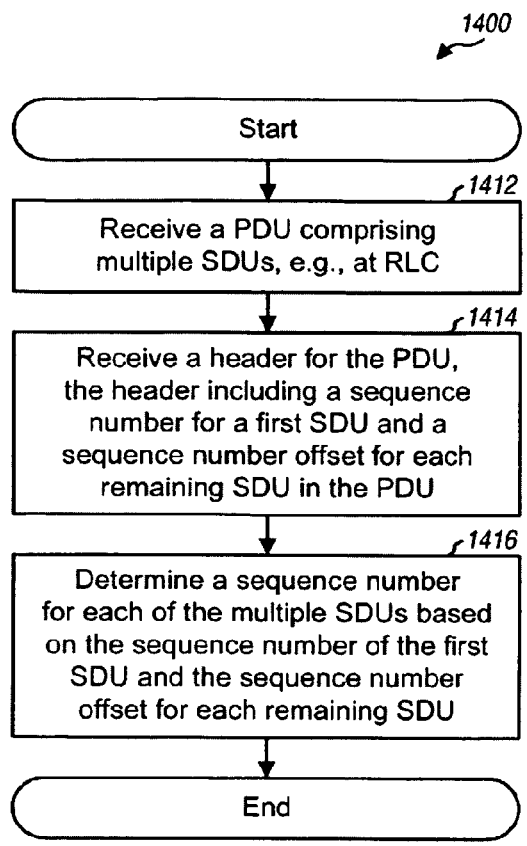
FIG. 14 shows a process for receiving data with SN offsets.

FIG. 14 shows a design of a process 1400 for receiving data with sequence number offsets. Process 1400 may be performed by a receiver. A PDU comprising multiple SDUs may be received (e.g., at RLC) (block 1412). The multiple SDUs may have consecutive or non-consecutive sequence numbers. A header for the PDU may be received and may include a sequence number for a first SDU and a sequence number offset for each remaining SDU in the PDU (block 1414). A sequence number for each of the multiple SDUs may be determined based on the sequence number for the first SDU and the sequence number offset for each remaining SDU in the PDU (block 1416). For example, the sequence number for each remaining SDU may be determined based on the sequence number offset for that SDU and a sequence number for a preceding SDU in the PDU.

Figure 15:
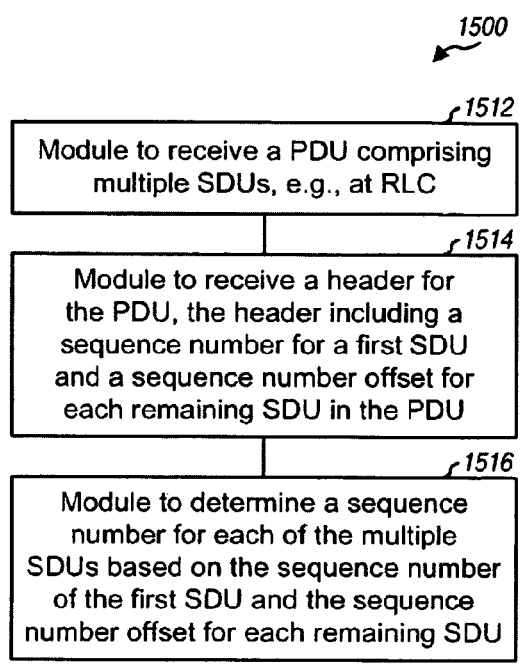
FIG. 15 shows an apparatus for receiving data with SN offsets.

FIG. 15 shows a design of an apparatus 1500 for receiving data with sequence number offsets. Apparatus 1500 includes a module 1512 to receive a PDU comprising multiple SDUs, a module 1514 to receive a header for the PDU, and a module 1516 to determine a sequence number for each SDU based on a sequence number for a first SDU and a sequence number offset for each remaining SDU.

Figure 16:
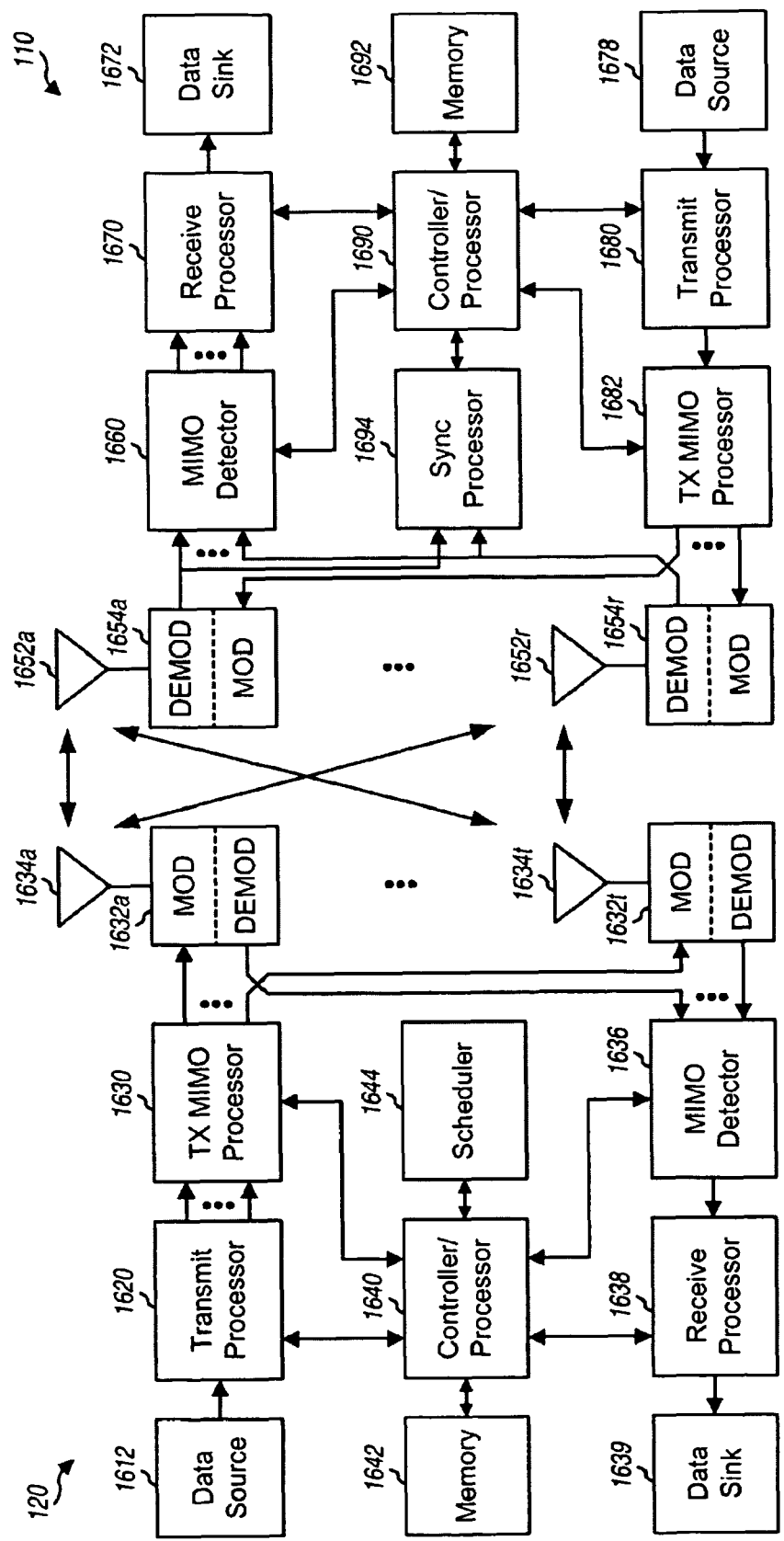
FIG. 16 shows a block diagram of a Node B and a UE.

FIG. 16 shows a block diagram of a design of Node B 120 and UE 110. In this design, Node B 120 is equipped with T antennas 1634a through 1634t, and UE 110 is equipped with R antennas 1652a through 1652r, where in general T≧1 and R≧1.

At Node B 120, a transmit processor 1620 may receive traffic data for one or more UEs from a data source 1612. Transmit processor 1620 may process the traffic data for each UE in accordance with a set of protocols (e.g., as shown in FIG. 2) to obtain output data. A transmit (TX) multiple-input multiple-output (MIMO) processor 1630 may multiplex the output data for all UEs with pilot data and may process (e.g., precode) the multiplexed data and provide T output symbol streams to T modulators (MOD) 1632a through 1632t. Each modulator 1632 may process a respective output symbol stream (e.g., for OFDM) to obtain an output chip stream. Each modulator 1632 may further process (e.g., convert to analog, amplify, filter, and upconvert) the output chip stream to obtain a downlink signal. T downlink signals from modulators 1632a through 1632t may be transmitted via T antennas 1634a through 1634t, respectively.

At UE 110, antennas 1652a through 1652r may receive the downlink signals from Node B 120 and provide received signals to demodulators (DEMOD) 1654a through 1654r, respectively. Each demodulator 1654 may condition (e.g., filter, amplify, downconvert, and digitize) a respective received signal to obtain samples and may further process the samples (e.g., for OFDM) to obtain received symbols. A MIMO detector 1660 may receive and process the received symbols from all R demodulators 1654a through 1654r and provide detected symbols. A receive processor 1670 may process the detected symbols in accordance with the set of protocols and provide decoded data for UE 110 to a data sink 1672. In general, the processing by MIMO detector 1660 and receive processor 1670 is complementary to the processing by TX MIMO processor 1630 and transmit processor 1620 at Node B 120.

On the uplink, at UE 110, traffic data from a data source 1678 and signaling may be processed by a transmit processor 1680, further processed by a TX MIMO processor 1682 (if applicable), conditioned by modulators 1654a through 1654r, and transmitted via antennas 1652a through 1652r. At Node B 120, the uplink signals from UE 110 may be received by antennas 1634, conditioned by demodulators 1632, detected by a MIMO detector 1636, and processed by a receive processor 1638 to obtain the traffic data and signaling transmitted by Node B 120 to UE 110.

Controllers/processors 1640 and 1690 may direct the operation at Node B 120 and UE 110, respectively. Controllers/processors 1640 and 1690 may each implement or direct process 800 in FIG. 8, process 1000 in FIG. 10, process 1200 in FIG. 12, process 1400 in FIG. 14, and/or other processes for the techniques described herein. Memories 1642 and 1692 may store data and program codes for Node B 120 and UE 110, respectively. A scheduler 1644 may schedule UEs for downlink and/or uplink transmission and may provide assignments of resources for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of processing data for transmission, comprising:
   receiving a first sequence number assigned to a first protocol data unit (PDU) by a first protocol;
   using the first sequence number from the first protocol at a second protocol, wherein the first protocol is above the second protocol in a protocol stack;
   receiving the first PDU from the first protocol as a service data unit (SDU) at the second protocol;
   resetting a sequence numbering of the second protocol at handover or connection setup;
   determining a delta based on a difference between a sequence numbering for the first protocol and the sequence numbering for the second protocol after resetting the sequence numbering;

determining a second sequence number for the SDU based on the first sequence number for the first PDU and the delta; and forming a second PDU at the second protocol based on the SDU.

2. The method of claim 1, further comprising:

addressing data within the SDU based on the second sequence number and an offset from a start of the SDU.

3. The method of claim 1, wherein the forming the second PDU comprises segmenting the SDU to obtain a segment comprising a portion of the SDU, forming the second PDU comprising the segment, and generating a header for the second PDU, the header comprising the second sequence number and a segment offset indicating a start of the segment within the SDU.

4. The method of claim 3, wherein the segment offset indicates a starting byte in the SDU corresponding to a first byte in the second PDU.

5. A method of processing data for transmission, comprising:

receiving a first sequence number assigned to a first protocol data unit (PDU) by a first protocol;

using the first sequence number from the first protocol at a second protocol;

receiving multiple PDUs from the first protocol as multiple service data units (SDUs) at the second protocol, each of the multiple PDUs being assigned a different sequence number by the first protocol, the multiple PDUs including the first PDU, and the multiple SDUs including a first SDU corresponding to the first PDU; and forming a second PDU at the second protocol based on the multiple SDUs, the second PDU including the first SDU followed by remaining ones of the multiple SDUs.

6. The method of claim 5, wherein the second PDU comprises all or a portion of the first SDU, all or a portion of a last SDU among the multiple SDUs, and all of each SDU between the first and last SDUs.

7. The method of claim 5, wherein the second PDU comprises all or a portion of each of the multiple SDUs.

8. The method of claim 5, further comprising:

determining a second sequence number for the first SDU based on the first sequence number for the first PDU; and generating a header for the second PDU, the header comprising the second sequence number for the first SDU and a header block for each remaining one of the multiple SDUs.

9. The method of claim 8, wherein the header further comprises a segment offset indicating a starting byte in the first SDU corresponding to a first byte in the second PDU.

10. The method of claim 8, wherein the header block for each remaining SDU comprises a segment length conveying an amount of data from the SDU being sent in the second PDU.

11. The method of claim 8, wherein the header block for each remaining SDU comprises a sequence number offset, the sequence number offset conveying a difference between a sequence number for the SDU and a sequence number for a preceding SDU in the second PDU.

12. The method of claim 8, wherein the header block for each remaining SDU comprises an extension bit indicating whether or not another header block for another SDU will follow in the header.

13. The method of claim 8, wherein the header block for each remaining SDU comprises a segment offset, the segment offset indicating a starting byte in the SDU being sent in the second PDU.

14. The method of claim 1, wherein the first protocol is below the second protocol in a protocol stack, and wherein the first sequence number is passed from the first protocol up to the second protocol.

15. The method of claim 1, further comprising:

assigning a sequentially increasing sequence number to each PDU generated at the first protocol;

passing a sequence number from the first protocol up to the second protocol for each PDU generated at the second protocol; and assigning each PDU generated at the second protocol with a sequence number determined based on the sequence number passed up by the first protocol for the PDU.

16. The method of claim 1, wherein the first protocol comprises Packet Data Convergence Protocol (PDCP) and the second protocol comprises Radio Link Control (RLC).

17. The method of claim 1, wherein the first protocol comprises Radio Link Control (RLC) and the second protocol comprises Packet Data Convergence Protocol (PDCP).

18. An apparatus for wireless communication, comprising:

at least one processor configured to receive a first sequence number assigned to a first protocol data unit (PDU) by a first protocol, to use the first sequence number from the first protocol at a second protocol, to receive multiple PDUs from the first protocol as multiple service data units (SDUs) at the second protocol, each of the multiple PDUs being assigned a different sequence number by the first protocol, the multiple PDUs including the first PDU, and the multiple SDUs including a first SDU corresponding to the first PDU, and to form a second PDU at the second protocol based on the multiple SDUs, the second PDU including the first SDU followed by remaining ones of the multiple SDUs.

19. The apparatus of claim 18, wherein the at least one processor is configured to receive the first PDU from the first protocol as a service data unit (SDU) at the second protocol, to determine a second sequence number for the SDU based on the first sequence number for the first PDU, and to form a second PDU at the second protocol based on the SDU.

20. The apparatus of claim 19, wherein the at least one processor is configured to segment the SDU to obtain a segment comprising a portion of the SDU, to form the second PDU comprising the segment, and to generate a header for the second PDU, the header comprising the second sequence number and a segment offset indicating a start of the segment within the SDU.

21. The apparatus of claim 18, wherein the at least one processor is configured to determine a second sequence number for the first SDU based on the first sequence number for the first PDU; and to generate a header for the second PDU, the header comprising the second sequence number for the first SDU and a header block for each remaining one of the multiple SDUs, the header block for each remaining SDU comprising at least one of a segment length, a sequence number offset, an extension bit, and a segment offset.

22. A computer program product, comprising:

a non-transitory computer-readable medium comprising:

code for causing at least one computer to receive a first sequence number assigned to a first protocol data unit (PDU) by a first protocol;

code for causing the at least one computer to use the first sequence number from the first protocol at a second protocol;

code for causing the at least one computer to receive multiple PDUs from the first protocol as multiple service data units (SDUs) at the second protocol, each of the multiple PDUs being assigned a different sequence number by the first protocol, the multiple PDUs including the first PDU, and the multiple SDUs including a first SDU corresponding to the first PDU; and code for causing the at least one computer to form a second PDU at the second protocol based on the multiple SDUs, the second PDU including the first SDU followed by remaining ones of the multiple SDUs.

23. A method of receiving data, comprising:
receiving a first protocol data unit (PDU) at a first protocol;
forming a first service data unit (SDU) at the first protocol based on the first PDU;
determining a first sequence number for the first SDU based on a header for the first PDU;
receiving the first SDU as a second PDU at a second protocol; and
determining a second sequence number for the second PDU based on the first sequence number for the first SDU, wherein the determining the second sequence number comprises determining the second sequence number for the second PDU based on the first sequence number for the first SDU and a delta.

24. The method of claim 23, wherein the forming the first SDU comprises
obtaining a segment offset from the header, and
mapping the first PDU to the first SDU starting at a location in the first SDU determined by the segment offset.

25. A method of receiving data, comprising:
receiving a first protocol data unit (PDU) at a first protocol;
forming a first service data unit (SDU) at the first protocol based on the first PDU;
determining a first sequence number for the first SDU based on a header for the first PDU;
receiving the first SDU as a second PDU at a second protocol;
determining a second sequence number for the second PDU based on the first sequence number for the first SDU;
forming multiple SDUs at the first protocol based on the first PDU, the multiple SDUs including the first SDU followed by remaining ones of the multiple SDUs; and
determining a sequence number for each of the multiple SDUs at the first protocol based on the header.

26. The method of claim 25, wherein the determining a sequence number for each of the multiple SDUs at the first protocol comprises
obtaining a sequence number offset for each remaining SDU from the header, and
determining the sequence number for each remaining SDU based on the sequence number offset for the SDU and a sequence number for a preceding SDU.

27. The method of claim 25, further comprising:
obtaining a segment offset for each of the multiple SDUs from the header; and
mapping a portion of data in the first PDU to each of the multiple SDUs starting at a location in the SDU determined by the segment offset for the SDU.

28. The method of claim 25, further comprising:
obtaining a segment length for each of the multiple SDUs from the header; and
determining an amount of data in the first PDU for each of the multiple SDUs based on the segment length for the PDU.

29. The method of claim 23, wherein the first protocol comprises Radio Link Control (RLC) and the second protocol comprises Packet Data Convergence Protocol (PDCP).

30. An apparatus for wireless communication, comprising:
at least one processor configured to receive a first protocol data unit (PDU) at a first protocol, to form a first service data unit (SDU) at the first protocol based on the first PDU, to determine a first sequence number for the first SDU based on a header for the first PDU, to receive the first SDU as a second PDU at a second protocol, to determine a second sequence number for the second PDU based on the first sequence number for the first SDU, to form multiple SDUs at the first protocol based on the first PDU, the multiple SDUs including the first SDU followed by remaining ones of the multiple SDUs, and to determine a sequence number for each of the multiple SDUs at the first protocol based on the header.

31. The apparatus of claim 30, wherein the at least one processor is configured to obtain a segment offset from the header and to map the first PDU to the first SDU starting at a location in the first SDU determined by the segment offset.

32. The apparatus of claim 30, wherein the at least one processor is configured to obtain at least one of a segment length, a sequence number offset, and a segment offset for each remaining SDU from the header.

33. An apparatus for wireless communication, comprising:
at least one processor configured to receive a first sequence number assigned to a first protocol data unit (PDU) by a first protocol, to use the first sequence number from the first protocol at a second protocol, wherein the first protocol is above the second protocol in a protocol stack, to receive the first PDU from the first protocol as a service data unit (SDU) at the second protocol, to reset a sequence numbering of the second protocol at handover or connection setup, to determine a delta based on a difference between a sequence numbering for the first protocol and the sequence numbering for the second protocol after resetting the sequence numbering, to determine a second sequence number for the SDU based on the first sequence number for the first PDU and the delta, and to form a second PDU at the second protocol based on the SDU.

34. A computer program product, including a non-transitory computer-readable medium, comprising:
code for receiving a first sequence number assigned to a first protocol data unit (PDU) by a first protocol;
code for using the first sequence number from the first protocol at a second protocol, wherein the first protocol is above the second protocol in a protocol stack;
code for receiving the first PDU from the first protocol as a service data unit (SDU) at the second protocol;
code for resetting a sequence numbering of the second protocol at handover or connection setup;
code for determining a delta based on a difference between a sequence numbering for the first protocol and the sequence numbering for the second protocol after resetting the sequence numbering;
code for determining a second sequence number for the SDU based on the first sequence number for the first PDU and the delta; and
code for forming a second PDU at the second protocol based on the SDU.

35. A computer program product, including a non-transitory computer-readable medium, comprising:
code for receiving a first protocol data unit (PDU) at a first protocol;

code for forming a first service data unit (SDU) at the first protocol based on the first PDU;
code for determining a first sequence number for the first SDU based on a header for the first PDU;
code for receiving the first SDU as a second PDU at a second protocol;
code for determining a second sequence number for the second PDU based on the first sequence number for the first SDU;

code for forming multiple SDUs at the first protocol based on the first PDU, the multiple SDUs including the first SDU followed by remaining ones of the multiple SDUs; and
code for determining a sequence number for each of the multiple SDUs at the first protocol based on the header.

* * * * *